US012766520B2

(12) United States Patent
Andre et al.

(10) Patent No.: US 12,766,520 B2
(45) Date of Patent: Oct. 20, 2026

(54) MILLING DEVICE AND PROCESS

(71) Applicants: Axel Guenther Andre, Croydon (AU); Food Process Engineering Pty Ltd, Research (AU)

(72) Inventors: Axel Guenther Andre, Croydon (AU); Bryant Hedley Ham, Research (AU)

(73) Assignee: Food Process Engineering Pty Ltd, Research (AU)

(*) Notice: Subject to any disclaimer, the term of this patent is extended or adjusted under 35 U.S.C. 154(b) by 222 days.

(21) Appl. No.: 18/577,858

(22) PCT Filed: Jul. 8, 2022

(86) PCT No.: PCT/AU2022/050713
§ 371 (c)(1),
(2) Date: Jan. 9, 2024

(87) PCT Pub. No.: WO2023/279165
PCT Pub. Date: Jan. 12, 2023

(65) Prior Publication Data

US 2024/0216921 A1 Jul. 4, 2024

(30) Foreign Application Priority Data

Jul. 9, 2021 (AU) ................................ 2021902111

(51) Int. Cl.
*B02C 13/26* (2006.01)
*B02C 7/11* (2006.01)
(Continued)

(52) U.S. Cl.
CPC ................ *B02C 13/26* (2013.01); *B02C 7/11* (2013.01); *B02C 13/08* (2013.01);
(Continued)

(58) Field of Classification Search
CPC ......... B02C 13/06; B02C 13/08; B02C 13/26; B02C 13/2804; B02C 13/282;
(Continued)

(56) References Cited

U.S. PATENT DOCUMENTS

| | | | |
|---|---|---|---|
| 1,784,983 | A | 12/1930 | Borton |
| 2,108,793 | A | 2/1938 | Borton |

(Continued)

FOREIGN PATENT DOCUMENTS

| | | | | |
|---|---|---|---|---|
| CN | 105562154 A | 5/2016 | | |
| CN | 106944233 A | * | 7/2017 | ............... B02C 7/12 |

(Continued)

OTHER PUBLICATIONS

International Search Report and Written Opinion issued in PCT/AU2022/050713, mailed Sep. 14, 2022 (11 pages).

*Primary Examiner* — Jared O Brown
(74) *Attorney, Agent, or Firm* — Fitch, Even, Tabin & Flannery LLP

(57) ABSTRACT

A milling device includes a housing having a flow path for conveying feed material through the housing, and a spindle extending into the housing and mounted on bearings that are at least partly shielded from the flow path. A rotor is disposed on the spindle and has two or more blades for impacting the feed material and for driving the feed material about the housing to cause autogenous milling thereof. A wall formation is arranged at a spacing about the spindle and delimits a plenum chamber about the spindle so that the bearings and the spindle are at least partly shielded from the flow path by the wall formation and the plenum chamber.

18 Claims, 10 Drawing Sheets

(51) Int. Cl.

| | |
|---|---|
| ***B02C 13/08*** | (2006.01) |
| ***B02C 13/28*** | (2006.01) |
| ***B02C 13/282*** | (2006.01) |
| ***B02C 17/00*** | (2006.01) |
| ***B02C 19/00*** | (2006.01) |
| ***D21D 1/30*** | (2006.01) |
| ***D21D 1/32*** | (2006.01) |
| *B02C 13/30* | (2006.01) |

(52) U.S. Cl.
CPC ........ *B02C 13/2804* (2013.01); *B02C 13/282* (2013.01); *D21D 1/30* (2013.01); *D21D 1/32* (2013.01); *B02C 13/30* (2013.01); *B02C 17/002* (2013.01); *B02C 19/0012* (2013.01)

(58) Field of Classification Search
CPC ............ B02C 19/0012; B02C 19/0018; B02C 19/005; B02C 7/06; B02C 7/11; B02C 7/182
See application file for complete search history.

(56) References Cited

U.S. PATENT DOCUMENTS

| | | | | | | |
|---|---|---|---|---|---|---|
| 2,575,380 | A | | 11/1951 | Borton | | |
| 2,709,958 | A | * | 6/1955 | Buen | B02C 13/26 | 241/242 |
| 3,490,704 | A | * | 1/1970 | Bourne | B02C 13/13 | 241/185.5 |
| 3,942,728 | A | * | 3/1976 | Christ | D21D 1/32 | 209/210 |
| 4,161,293 | A | * | 7/1979 | Beelmann | B02C 13/26 | 241/67 |
| 4,479,613 | A | * | 10/1984 | Rowledge | B02C 13/13 | 241/97 |
| 4,641,791 | A | | 2/1987 | Cermanov | | |
| 4,659,026 | A | * | 4/1987 | Krause | B02C 13/1842 | 241/275 |
| 5,263,653 | A | * | 11/1993 | Pallmann | B02C 13/282 | 241/188.1 |
| 6,021,966 | A | * | 2/2000 | Doenges | F26B 17/10 | 241/62 |

FOREIGN PATENT DOCUMENTS

| | | | | | |
|---|---|---|---|---|---|
| CN | 107081187 | A | * | 8/2017 | B02C 7/186 |
| CN | 113877682 | A | * | 1/2022 | B02C 13/28 |
| EP | 2193849 | A1 | * | 6/2010 | B02C 13/20 |
| GB | 234366 | A | * | 5/1925 | B02C 7/06 |
| GB | 364954 | A | * | 1/1932 | B02C 13/26 |
| JP | S64-43352 | A | | 2/1989 | |

* cited by examiner

MILLING DEVICE AND PROCESS

CROSS-REFERENCE TO RELATED APPLICATIONS

This application is a U.S. national phase application filed under 35 U.S.C. § 371 of International Application Number PCT/AU2022/050713, filed Jul. 8, 2022, designating the United States, which claims priority from Australian Application Number 2021902111, filed Jul. 9, 2021.

FIELD OF THE PRESENT INVENTION

The present invention relates to a milling device and a method of milling.

BACKGROUND OF THE PRESENT INVENTION

Milling devices can be used for the range of purposes including, and by no means limited to: forming particles of recyclable material such as plastic, glass and metal; forming particles from biodegradable material; and separating material having different brittleness such as fibres and plaster. Milling devices can function in different ways, including impact milling in which the material to be milled is impacted by hammering surfaces or cutting blades, and autogenous milling in which portions of feed material impact with each other to cause the material to break into smaller particles.

It is an object to provide a new milling device.

SUMMARY OF THE INVENTION

An embodiment relates to a milling device that includes:

- a housing having a flow path for conveying feed material through the housing;
- a rotor disposed on a spindle in the housing, the rotor having two or more blades for impacting the feed material and for driving the feed material about the housing to cause autogenous milling thereof;
- the housing having a feed inlet for supplying the feed material upstream of the rotor, and a product outlet downstream of the rotor; and
- a baffle arranged in the housing so that the flow path has an annulus portion downstream of the rotor and the product outlet is located to discharge milled feed material from the annulus portion.

An embodiment relates to a milling device that includes:

- a housing having a flow path for conveying feed material through the housing;
- a rotor disposed on a spindle in the housing, the rotor having two or more blades for impacting the feed material and for driving the feed material about the housing to cause autogenous milling thereof;
- the housing having a feed inlet for supplying the feed material upstream of the rotor, and a product outlet downstream of the rotor; and
- wherein the spindle extends into the housing and is mounted on bearings that are at least partly shielded from the flow path.

Without wanting to be limited by theory, operation of the rotor at high speeds can create a pressure gradient in the housing. Specifically, rotation of the rotor at high speeds pushes air in the housing toward the outer sidewall of the housing, creating a reduced pressure zone in a central region of the housing near a rotational axis of the rotor and creating an increased pressure zone toward the outer sidewall of the housing. One of the advantages of this embodiment is that the spindle need not be exposed to the pressure in the flow path, which reduces the likelihood of leakage of lubricant from the bearings that mount the spindle. That is to say, the bearings are at least partly shielded from the flow path. Throughout this specification, the phrase the bearings being "at least partly shielded from the flow path" embraces the bearings being in an effective or substantial controlled pressure environment relative to the pressure conditions of the flow path.

One of the advantages of this embodiment is that leakage of lubricant from the bearings can be minimised.

The bearings may be arranged outside of the flow path and within the housing.

When the milling device is in use, the bearings are exposure to air pressure that differs to air pressure at a central region of the housing.

The housing may include a wall formation that defines at least part of an annulus portion of the flow path, the annulus portion having a depth in an axial direction of the spindle, and the wall formation converges toward the spindle and a rear face of the rotor so that the spindle is at least partly shielded from the flow path.

The spindle may be mounted on bearings that is arranged outside of the annulus portion.

Suitably, the bearings are located outside of the annulus portion and within the housing. An advantage this provides is the bearings can be located in a position where the bearings can support the spindle and rotor, yet leakage of lubricant is minimised.

The distance between the bearing and rear of the rotor may be as small as possible to provide maximum support to the rotor. In one example, the spacing may range from 2 to 250 mm. In another example, the spacing may range from 5 to 250 mm. In another example, the spacing may range from 10 to 200. In another example, the spacing may range from 20 to 150 mm. In another example, the spacing may range from 30 to 100 mm. In another example, the spacing may range from 40 to 100 mm. In another example, the spacing may range from 50 to 80 mm. In another example, the spacing may range from 50 to 70 mm. In another example, the spacing may range from 50 to 60 mm.

When in use the bearings are exposure to air pressure that differs to air pressure at a central region of the housing. The air pressure to which the bearings are exposed will be greater than the air pressure at the central region of the housing.

The flow path may have an annulus portion downstream of the rotor and the product outlet is located to discharge milled feed material from the annulus portion.

The milling device can be operated in an impact milling mode and in an autogenous milling mode. The impact milling mode and the autogenous milling mode may be operated simultaneously.

The rotor and at least a part of the housing define the annulus portion.

The housing includes a wall formation that defines a depth of the annulus portion in an axial direction of the spindle, and the wall formation converges toward the spindle and a rear face of the rotor so that the spindle is at least partly shielded from the flow path. A clearance gap is provided between the wall formation and the spindle through which the spindle extends and allows the spindle to rotate. In one embodiment, the wall formation at least partly shields the bearings of the spindle from the flow path. The need to rotate the spindle provided the presence of the clearance gap means that bearings are at least partly shielded from the flow path.

The wall formation may define a plenum chamber about the spindle and at least part of a spindle mounting assembly on which the spindle is mounted. In other words, the spindle mounting assembly is shielded or located outside of the flow path for the device. The spindle mounting assembly may include a spindle housing with contains the bearings.

The wall formation may include a rear wall and a baffle, in which the baffle extends toward the spindle and the rear surface of the rotor. The baffle may be arranged at a spacing about the spindle which defines the plenum chamber about the spindle. That is to say, the plenum chamber may be located at least in part between the baffle and the spindle. The rear wall may also extend toward the spindle, suitably laterally toward the spindle and in part defines the plenum chamber.

The plenum chamber may be located inside the housing.

The baffle may include an inner wall that is arranged about the spindle.

The baffle wall may have an inner edge that is spaced from at least one or a combination of: i) the spindle or ii) the rotor, by a clearance gap that allows the spindle to rotate without contacting the baffle and allows restricted passage of air between the plenum chamber and the flow path. For instance, the clearance gas allows restricted passage of air from the plenum chamber through the clearance gap into the flow path. Although the clearance gap can allow a restricted passage of air, the bearings are effectively and substantially shielded from the flow path so that the pressure conditions at the bearings is controlled and differs to the pressure conditions in the flow path when the milling device is in use.

The plenum chamber may also include an air inlet allowing air from outside the housing to enter the plenum chamber and be drawn through the clearance gap. The is to say the air inlet may allow ambient air to enter the flow path.

The clearance gap between the baffle and the spindle may be adjacent to the reduced pressure zone which draws air from the plenum chamber into the reduced pressure zone. The flow of air being drawn through the clearance gap in turn draws air into the plenum chamber through the air inlet to create a passage of the air through the plenum chamber and over at least the outside of the spindle. In the event that operation of the device generates heat in the spindle, the air flowing over the spindle and through the clearance gap can cool the spindle. Cooling the spindle can in turn cool the bearings of the spindle.

The spindle may be mounted on at least one lubricated bearing. For instance, the spindle may be mounted a first and second lubricated bearings, in which the first lubricated bearing is arranged proximate to the rotor, and the second lubricated bearing is arranged remotely from the rotor.

In one embodiment, the device may include a first lubricated bearing that is located outside of the flow path of the device. In this instance, the first lubricated bearing will not be directly exposed to the reduced pressure zone that can suck lubricant from the bearing. For example, the first lubricated seal may be located in the plenum chamber. The device may also include a second lubricated bearing for mounting the spindle that is located outside the housing.

In another embodiment, the first and second lubricated bearings may be arranged outside of the housing.

The baffle may include an end wall arranged laterally to the inner wall, in which the end wall faces a rear surface of the rotor.

The inner wall of the baffle may be cylindrical, so that the inner wall can be referred to as an inner cylindrical wall.

The baffle may be arranged so that the annulus is concentric with the spindle.

In one embodiment, the boundary of the baffle can define the area of the rotor to which air has an open unobstructed passage to the rotor. In the absence of the baffle, the flow rate of air through the device can, to a large extent, be affected by the rotor.

In one embodiment, the end wall is spaced from the rear surface of the rotor by a clearance gap which limits an area of a rear surface of the rotor that faces the flow path. In other words, the end wall can control the flow rate of air, the flow rate of the milled material through feed material, and in turn, the residence time of the milled product. This can have an impact on the particle size and dryness of the milled product.

The end wall the extends outwardly from the inner wall of the baffle and covers from 10 to 60 percent of the surface of rear blades on the rotor, and suitable from 25 to 50% percent of the surface of the rear blades on the rotor.

The housing may also include a removable front wall for accessing the flow path. In one embodiment the housing may include a release mechanism for securing the front wall in a closed position. For example, the release mechanism may include a locking ring that pivots, the locking ring having locking notches that engage engagement notches on the front wall when in the closed position. The locking ring may be pivoted, in which the locking notches are offset with the engagement notches, in other words align with gaps between the engagement notches to allow the front wall to be opened, and the locking ring is pivoted to align with the locking notches with the engagement notches and press against the engagement notches when in the closed position. In one example, the locking ring may be pivoted clockwise and anticlockwise, to align and offset the locking notches and the engagement notches. In another example, the locking ring can be pivoted in the same direction to align and offset the locking and engagement notches.

The device may have an actuator for pivoting the locking ring clockwise and anticlockwise to lock and release the front wall.

The outer sidewall of the housing may extend about a perimeter of the housing, and the front wall and a rear wall are oppositely disposed at ends of the outer sidewall. The rotor may have a front portion that faces toward the front wall and rear portion that faces toward the rear wall. The rotor may have a perimeter portion that faces toward the outer sidewall.

The outer sidewall of the housing may be cylindrical. That is to say the outer sidewall may be an outer cylindrical wall.

The feed inlet may be provided in the front wall.

The feed inlet may be provided concentrically to an axis of rotation to the rotor.

In one embodiment, spindle may rotate about a horizontal axis.

In another embodiment, the spindle may rotate about a vertical axis.

The product outlet may include a first outlet opening that allows milled product to be discharged tangentially from the housing. For example, the first outlet opening may be located in the sidewall of the housing that defines part of the annulus portion of the flow path, and includes a discharge pipe that is arranged to allow milled material to be discharged tangentially from the housing.

The product outlet may include a second outlet that allows milled product to be discharged laterally from the flow path. For example, the second opening may be located in the wall formation, such as the rear wall of the housing that defines part of the annulus portion of the flow path. Although it is possible that the first and second outlet openings may be operated simultaneously, ordinarily only one of the first and second outlet is used during operation of the milling device. In this instance, a plug can be located in either one of the first and second outlet openings to allow use of the alternative.

The rotor may be a high-speed rotor that creates negative pressure towards the spindle.

The rotor may be operated so that the outer periphery of the rotor has a speed up to 1200 km/hr, and suitably a speed in the range of 700 to 1200 km/hr, and even more suitably in the range of 900 to 1200 km/hr.

The rotor may be driven by a motor using any suitable transmission. For instance, the motor and the spindle may have pulleys that are operably connected by looped (continuous) belt.

The milling device may have a classifying ring that extends inward toward the spindle of the housing. The classifying ring may extend from the outer sidewall of the housing toward the spindle.

The classifying ring may be positioned to the rear of the rotor. In other words, the classifying ring may be positioned downstream of the rotor.

The position of the classifying ring relative to the rotor may be adjustable.

The adjustability of the classifying ring may include multiple fixing points for fixing the classifying ring to a selection of the fixing points.

The classifying ring may have an inclined surface extending from the sidewall of the housing at an acute angle and away from a rear of the rotor at an angle in the range of 120° to 170°. Suitably, the inclined surface extends at an acute angle in the range of 125° to 165°.

The milling device may have a first cooling assembly for cooling the spindle extending into the housing, and in turn for cooling the lubricant of the lubricated bearings of the spindle.

The first cooling assembly may in part be provided the air stream passing through the plenum chamber. That is by the air stream entering via the air inlet, over the spindle, and then through the air gap.

The first cooling assembly may also include a first cooling jacket about the spindle. The cooling jacket include water passageway about the spindle for cooling water.

The milling device may include a second cooling assembly including a second cooling jacket arranged about at least part of the housing for cooling the housing.

The milling device may include a temperature sensor that detects the temperature of the spindle, and water valve for adjusting the flow of cooling water through the water jacket and an actuator that receives an output signal from the temperature sensor to operate the water valve.

An embodiment relates to a method for milling feed material in a milling device, the process includes the steps of:

- supplying material to be milled into a housing having a flow path;
- conveying feed material along the flow path through the housing;
- operating a rotor having two or more blades, the rotor being disposed on a spindle in the housing so that the rotor impacts the feed material to cause impact milling, and that drives the feed material about the housing to cause autogenous milling, wherein the device has a baffle arranged in the housing so that the flow path has an annulus portion downstream of the rotor and the outlet is located to discharge milled feed material from the annulus portion.

An embodiment relates to a method including the steps of:

- supplying material to be milled into a housing having a flow path;
- operating a rotor having two or more blades, the rotor being disposed on a spindle in the housing so that the rotor impacts the feed material to cause impact milling, and that drives the feed material about the housing to cause autogenous milling, the spindle extends into the housing and is mounted on bearings that are at least partly shielded from the flow path; and
- discharging milled product from the flow path downstream of the rotor.

The method may include operating the rotor includes subjecting the bearings to pressure that differs to pressure at a central region of the housing.

The method may include locating a wall formation that defines a depth of the annulus configuration in an axial direction of the spindle, and the wall formation converges toward the spindle and a rear face of the rotor so as to located the spindle outside of the flow path for the device, and thereby minimising a risk of leakage of the lubricant from bearing mounting the spindle.

The method may include:

- providing the wall formation with a rear wall and a baffle, in which the baffle includes an inner wall that is arranged about the spindle and an end wall that is spaced by a clearance gap from at least one or a combination of: i) the spindle; or ii) the rotor, and
- operating the rotor creates a pressure gradient in the housing with a reduced pressure zone in a central region of the housing, and the clearance gap between the baffle and the spindle and/or the rotor allows restricted passage of air to be drawn through the clearance gap and thereby minimising a risk of leakage of the lubricant from bearing mounting the spindle.

The method may include selecting the coverage of the rear surface of the blades of the rotor by selecting the baffle from a set of baffles having different sized end walls.

The method may include operating a release mechanism for securing and opening a front wall to allow maintenance in which the release mechanism a locking ring having locking notches that engage engagement notches on the front wall, and pivoting the locking ring in which the locking notches align with gaps between the engagement notches to allow the front wall to be opened, and the locking ring is pivoted to align with the locking notches with the engagement notches to lock the front wall.

The method may include operating the rotor so that the outer periphery of the rotor has a speed up to 1200 km/hr, and suitably a speed in the range of 700 to 1200 km/hr, and even more suitably in the range of 900 to 1200 km/hr.

The method may include providing the milling device with a classifying ring that extends inward toward the spindle from the housing, and adjusting the operating position of the classifying ring by moving the position of the classifying ring relative to the rotor, and in turn change the residence of milled product.

The milling device may have a first cooling assembly arranged for cooling the spindle extending into the housing, and the method may include operating the first cooling assembly to cool the first cooling assembly and lubricant of the lubricated bearings of the spindle.

The milling device may include a second cooling assembly, and the method may include operating the second cooling assembly to cool the housing.

The method may include sensing temperature of the spindle, and/or the housing, and adjusting the first cooling assembly and/or second cooling assembly to control the temperature of the spindle and the housing.

The method may also include any one or a combination of the features of the milling device described herein.

An embodiment relates to a milling device that includes:

- a housing and a flow path through the housing for the feed material, the housing having an inlet for supplying the feed material to the flow path, and an outlet for discharging the feed material that has been milled;
- a rotor disposed on a spindle in the housing, the rotor having two or more blades for impacting the feed material and for driving the feed material about the housing to cause autogenous milling thereof; and
- a cooling assembly for cooling a portion of the spindle projecting into the housing, and in turn for cooling bearings of the spindle.

The milling device described in the paragraph immediately above may also include any one or a combination of the features of the milling device described herein.

BRIEF DESCRIPTION OF THE DRAWINGS

A preferred embodiment of the present invention will now be described with reference to the accompany Figures which may be summarised as follows.

DETAILED DESCRIPTION

Figure 1:
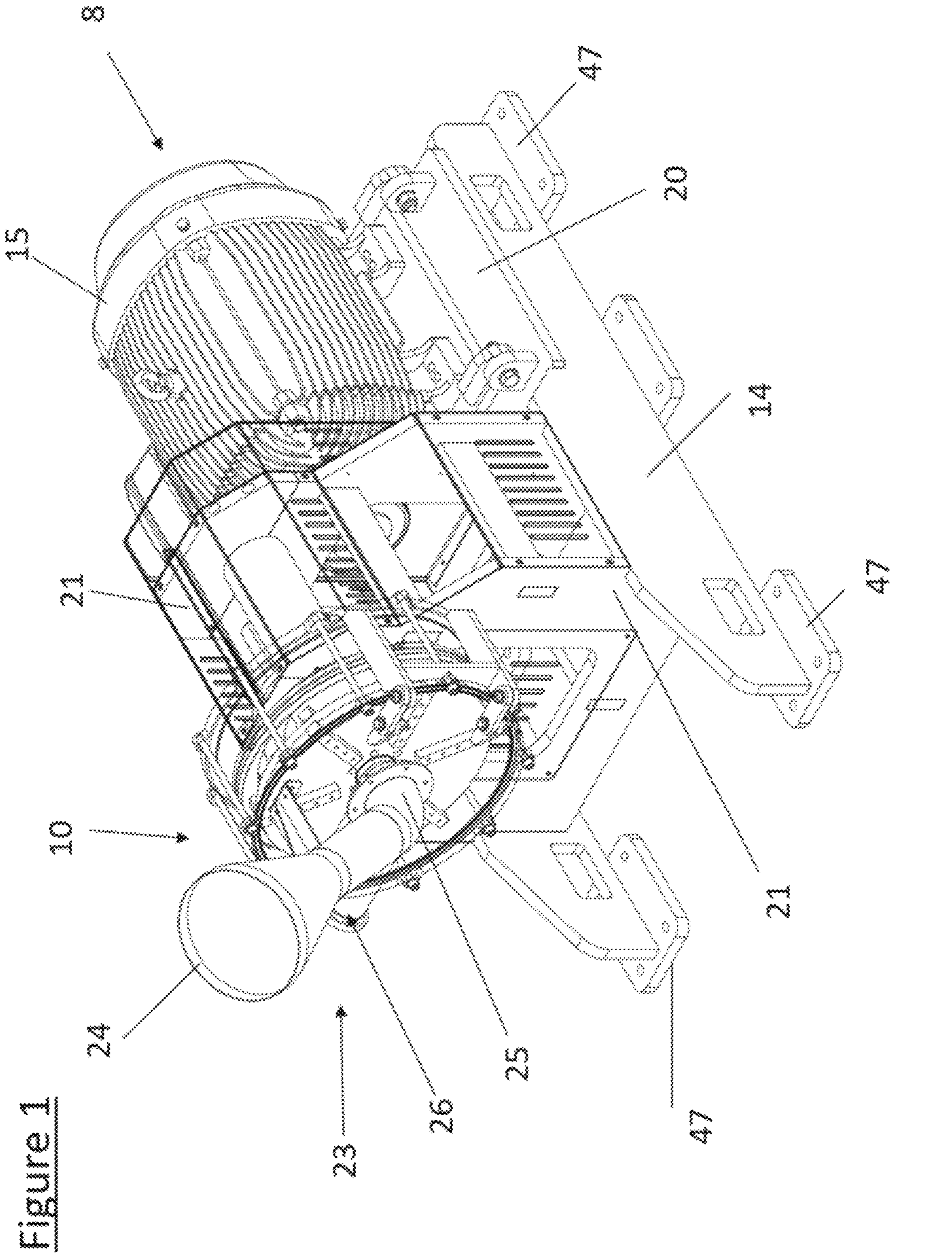
FIG. 1 is a perspective view of a milling device comprising a base, a mill housing at a front end of the base, a rotor disposed on a spindle that extends into the mill housing, an electric motor at a rear end of the base for driving the spindle, and the housing having a feed inlet for supplying the feed material upstream of the rotor, and a product outlet downstream of the rotor. The mill housing is illustrated in a transparent manner to allow the rotor to be seen.

A preferred embodiment will now be described in the following text which includes reference numerals that correspond to features illustrated in the accompanying Figures. Where possible, the same reference numeral has been used to identify the same or substantially similar features in different embodiments. However, to maintain the clarity of the Figures all reference numerals are not included in each Figure.

Figure 2:
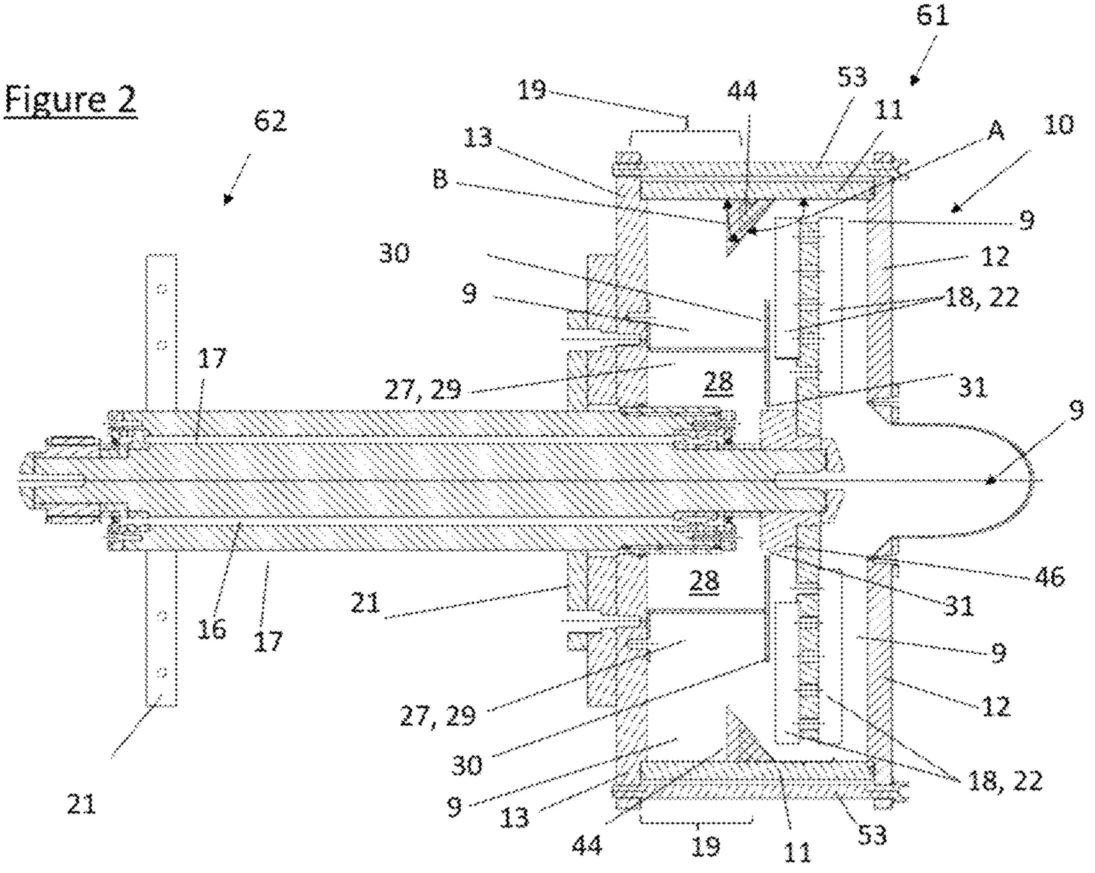
FIG. 2 is a horizontal cross-sectional view through the housing, the rotor in the housing, the spindle on which the rotor is mounted, and a spindle housing as shown in FIG. 1.

With reference to FIGS. 1 and 2, the milling device 8 comprises a base chassis 14 having feet 47 that can be anchored to a concrete foundation. The rear end of the base chassis 14 includes baseplate 20 on which a 50 kW motor 15 is mounted. The motor 15 rotates a spindle 16 that is mounted in a cradle 21 in the middle of the milling device 8, and a rotor 18 is fitted to a front end of the spindle 16 in a housing 10 located at the front end of the device 8. Feed material is conveyed along a flow path 9 through the housing 10 whilst being milled into smaller particles, namely via impact milling with blades 22 best seen in FIG. 2 on the rotor 18, and via autogenous milling.

The rotor 18 is driven about a horizontal axis and the housing 10 has a vertical cylindrical cross-section in which the rotor 18 rotates at high speed. Although not shown in detail in the Figures, the front-end of the motor 15 and a rear end of the spindle 16 comprise large and small diameter pulleys respectively that are operably connected by a flat loop belt. To achieve autogenous milling, ideally the outer diameter of the rotor 18 will approach the speed of sound. In the case of the embodiment illustrated in FIGS. 1 to 7, a ratio of the large pulley of the motor 15 to the small pulley of the spindle 16 is approximately 3 to 1 and the rotor 18 can be operated at varying speeds up to, and in excess of, 7000 or 8000 revolutions per minute. The outer diameter of the rotor 18 may be of any size range, including, for example a diameter in the range of 450 to 500 mm. Irrespective of the diameter of the rotor 18, the outer extremities of the rotor 18 can be operated at speeds close to 340 m/s (1200 km/hr), when the motor 15 is operated within normal operating ranges.

The housing 10 comprises a cylindrical sidewall 11 in which the spindle 16 and rotor 18 are coaxially mounted, and oppositely disposed front and rear walls 12 and 13 at the ends of the sidewall 11. The cylindrical sidewall 11, and the front and rear walls 12 and 13 are transparent in FIG. 1, and can be best seen in cross-section in FIG. 2. The front wall 12 has a feed inlet 23 that includes a funnel 24 and ducting 25 extending out from the front wall 12 which directs feed material toward a central front portion of the rotor 18. The flow path 9 for the material extends from the feed inlet 23 to the rotor 18 where the feed material will undergo initial impact milling by impacting with the rotor 18 and the blades 22 which breaks the feed material into a first size range. The high speed of the rotor 18 drives the material radially outward toward the extremities of the rotor 18 and toward the outer sidewall 11 of housing 10 where particles and air swirl in a circular manner about the housing 10. Suitably, the inner surface of the sidewall 11 in contact with the particles and the swirling air is ideally smooth. By way of example, the smooth inner surface may include either one or a combination of the following. i) A coating comprising tungsten carbide in a nickel chrome matrix. The tungsten carbide/nickel chrome may be applied by either plasma spraying, or laser cladding, depending on the thickness of the coating required. ii) A polished chrome coating. iii) A polished stainless steel. Polished chrome or stainless steel can be readily cleaned and is particularly well suited for milling food.

Figure 5:
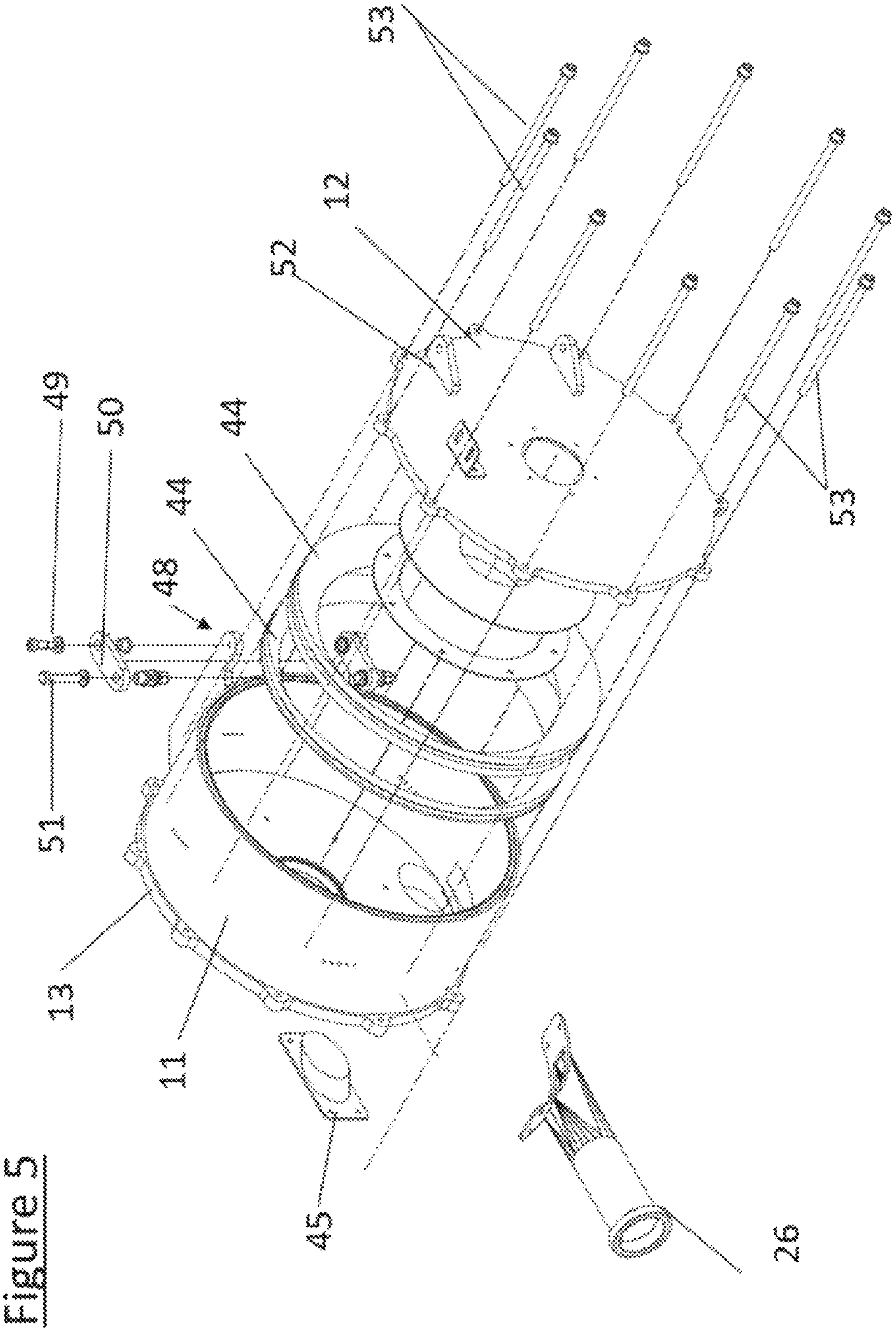
FIG. 5 is an exploded view of the housing shown in FIGS. 1 and 2 in which the rotor, spindle and baffle have been omitted.
Figure 10:
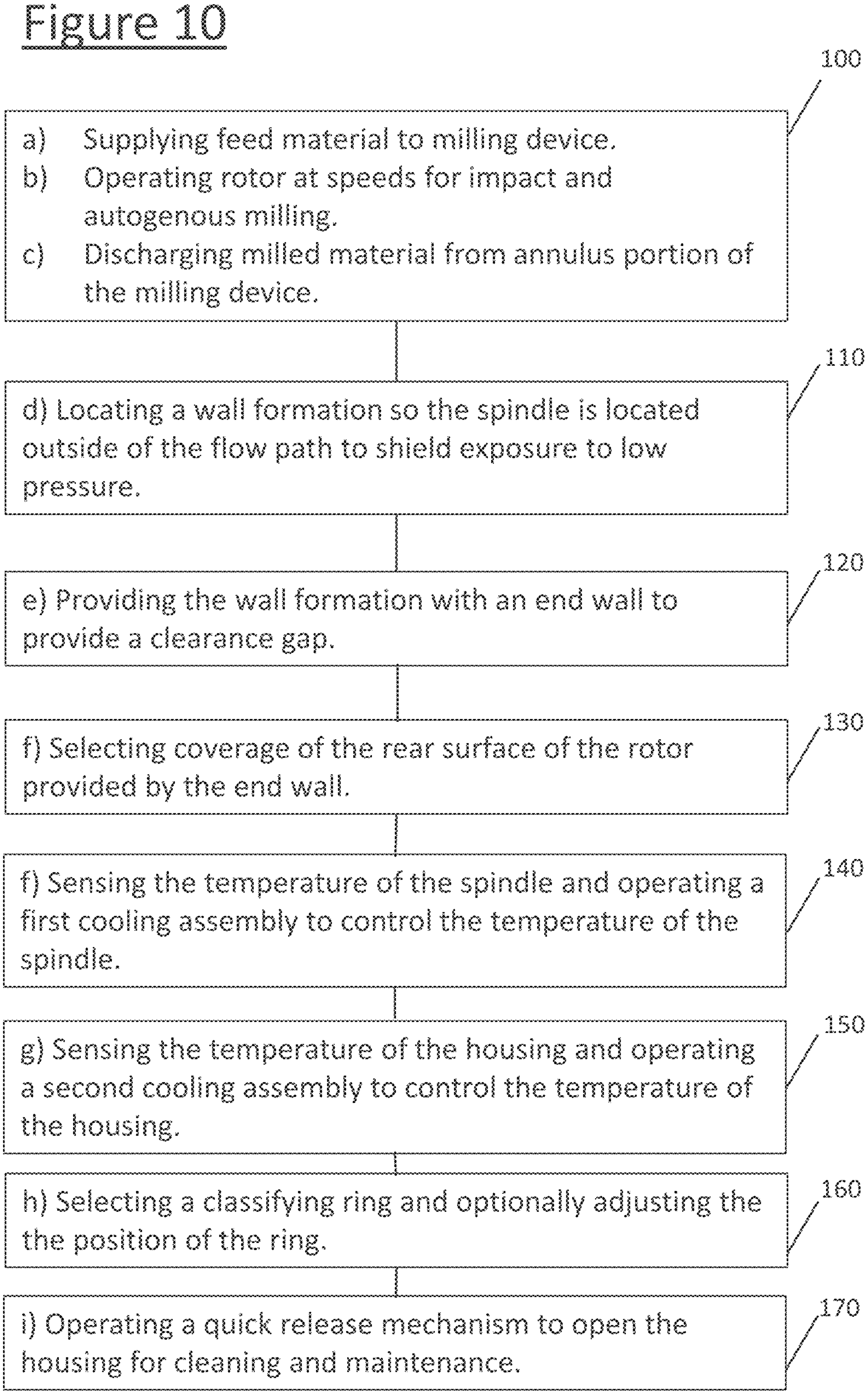
FIG. 10 is a block diagram illustrating method steps for operating the milling device shown in FIGS. 1 to 9.
Figure 11:
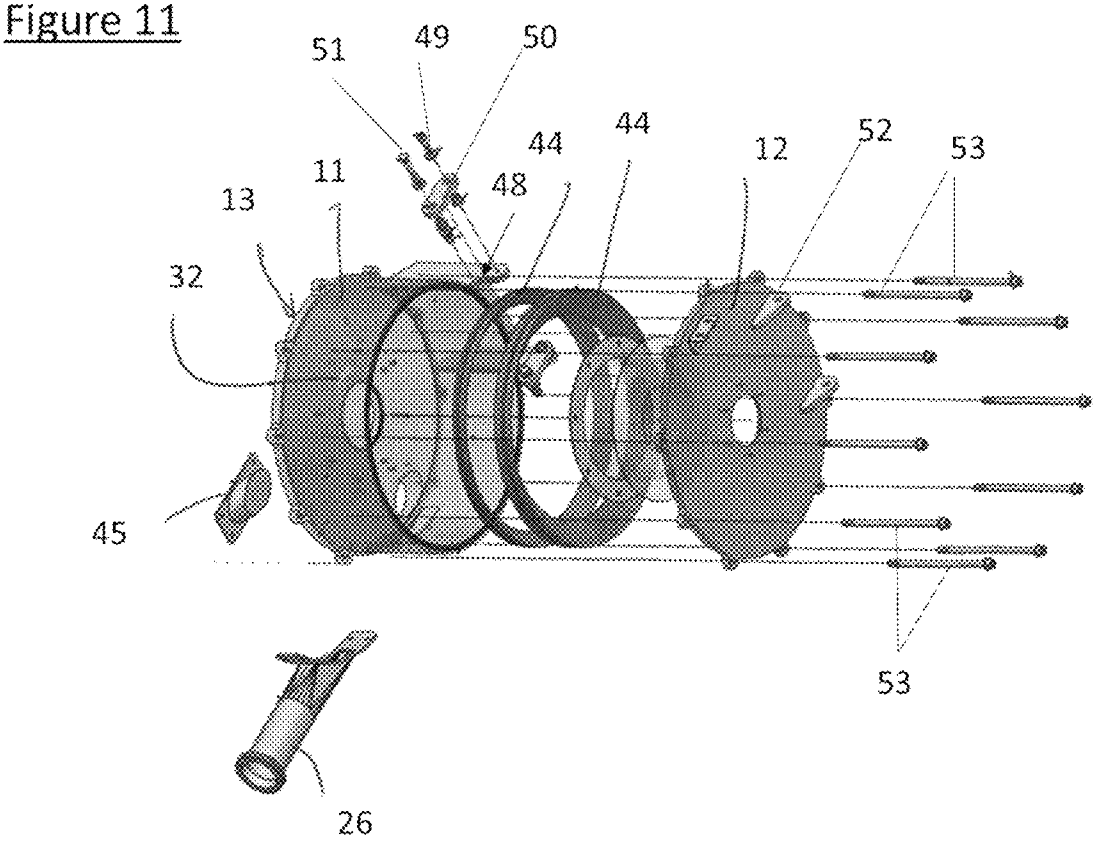
FIG. 11 is another exploded view of FIG. 5 with an exemplary air inlet.

As can best be seen in FIGS. 5 and 10, the front wall 12 is connected to the sidewall 11 by way of a hinge mechanism 48. In the case of the preferred embodiment, the hinge mechanism 48 has a mounting bracket to the sidewall 11 of the housing 10, a first pivot pin 49 connected to a first end of a hinge linkage 50, and a second pivot pin 51 connected to a second end of the hinge linkage 50 which is in turn are connected to a cooperating front wall bracket 52 that is attached to the front surface of the front wall 12. In the case of the embodiment shown in FIG. 5, the front and rear walls 12 and 13 respectively, can be clamped in a closed position to the opposite ends of the cylindrical sidewall using clamping bolts 53 that are spaces about the perimeter of the housing 10.

Figure 9:
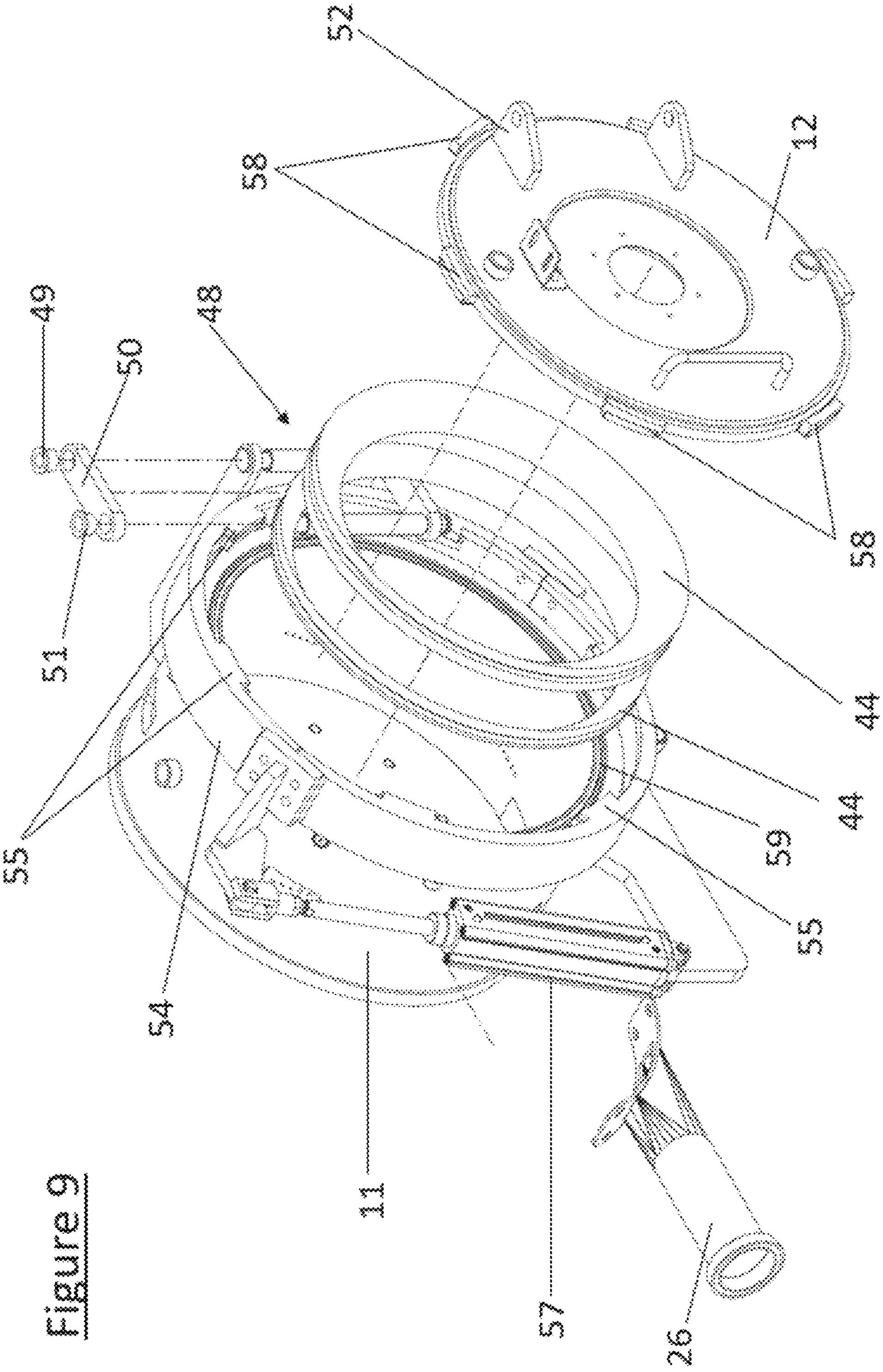
FIG. 9 is an exploded view of part of the milling housing, including a front wall, sidewall, a discharge tube, two classifying rings one of which can be fitted to an inside of the milling housing during operation, and a quick release locking assembly for releasably locking the front wall to the sidewall.

In the case of the embodiment shown in FIG. 9, the device 10 has a quick release mechanism to allow for rapid opening and closing of the front wall 12. The quick release mechanism allows the front wall to be opened and the housing 10 flushed, washed and/or disinfected in a short time frame, which may be required depending on the feed material. For example, between milling different types of the food materials. The front wall 12 is held in a closed position by a cylindrical sliding locking ring 54 that pivots in clockwise and anticlockwise directions to engage and lock the front wall 12 in a closed position, and disengage and unlock the front wall 12 so that the front wall 12 can be opened. The locking ring 54 is driven by an actuator 56 that is operably connected to the locking ring 54 to move the locking ring clockwise and anticlockwise. Suitably the actuator 56 includes a pneumatic piston and cylinder arrangement 57. The locking ring 54 has locking notches 55 spaced about an inner perimeter of the locking ring 55 and the front wall 12 has co-operating engagement notches 57. The locking notches 55 align with spaces between the engaging spaces to allow the front wall 12 to be opened, and after the front wall 12 is closed, the actuator 56 can be operated to pivot the locking ring which moves the locking notches to engage an outside of the front wall notches 57 which locks the front wall 12 in the closed position, preventing the front wall 12 from being opened. In addition, the locking notches press against the outside of the front wall notches 57 which in turn presses the front wall 12 against the sidewall 11, suitably form a seal between the front wall 12 and the sidewall 11. The rear wall 13 can be secured in a closed position independently of the front wall 12. For instance although not shown in FIG. 9, the sidewall 11 may have outer brackets and clamping bolts between the outer brackets and the rear wall 13 to secure the rear wall 13 in position. In addition, one or more sealing gaskets 59 may be located between an inner surface of the front wall 12 and the sidewall 11 to assist in forming a seal between the front wall 12 and the sidewall 11 when closed.

In the case of the preferred embodiment shown in FIGS. 1 to 7, the rotor 18 includes blades or vanes 22 positioned on at the front and rear of the rotor 18. Ideally the blades 22 are mounted in pairs on opposite sides of a main plate of the rotor 18 so that the blades 22 can be clamped together using suitable screw threaded fasters, in which one of the blades 22 includes a tight fitting bore for receiving the fastener and a bore of the other blade 22 of each pair has a cooperating screw thread for clamping the blades 22 together on the main plate of the rotor 18. It will be appreciated that any number of pairs can be attached to the main plate of the rotor 18. To maintain stability and minimise vibrations, ideally the blades 22 are evenly spaced about the rotor 18.

The feed material, including particles that have been impact milled enter the swirling air toward the perimeter of the housing 10 where the particles accelerate to high speed and randomly collide with each other to achieve autogenous milling. As the particle size of the feed material reduces, the flow path 9 for the particles extends from a front side of the rotor 18, across a depth or circumferential width of the rotor 18, and then to the rear of the rotor 18. At the rear side of the rotor 18, the flow path 9 has an annulus portion 19 formed at least in part by the rear of the rotor 18, the sidewall 11 of the housing 10, and rear wall 13 of the housing 10. In one embodiment not illustrated in the Figures, the annulus portion 19 may in part be defined between the rear wall 13 of the housing 10 having a disk portion that engages the sidewall 11 and a cylindrical portion that extends from the disk portion forward toward the rotor 18. In one example, the cylindrical portion may have a constant diameter. In another example the cylindrical portion may be a tapering cone so as to extend toward the front wall and toward the spindle 16, or a rotating axis of the spindle. In the case of the embodiment shown in FIGS. 2 and 3, the housing 10 includes a baffle 27 having a cylindrical inner cylindrical wall 29 and a lateral end wall 30 that are connected to the rear wall 13. The annulus portion 19 is also in part defined by an adjustable classifying ring 44 on an inner surface of the sidewall 11 that the particles traverse or pass over before being discharged from the device 8. The adjustable classifying ring 44 is connected to the sidewall 11 of the housing 10 at the rear side of the rotor 18.

The classifying ring 44 can be adjusted to control the residence time of the particles in the swirling air, and in turn control the size of the particles being discharged from the device 8. As the residence time of the particles in the swirling air increases, the particles are milled further in autogenous milling.

The classifying ring 44 can be adjusted in at least three parameters to control the residence time. Specifically, in a first adjustment, the classifying ring 44 can be moved fore and aft in the housing 10. For instance, in FIG. 2 the classifying ring 44 is illustrated as extending between the blades 22 of the rotor 18 and the sidewall 11 of the housing 10. In another position, not illustrated in the Figures, the classifying ring 44 can be moved further aft so that the foot of the classifying ring 44 is spaced rearwardly by a first spacing from a vertical rear plane of the blades 22 of the rotor 18. In yet another position, not illustrated in the Figures the classifying ring 44 can be moved even yet further aft by a second spacing between the rear plane of the blades 22 of the rotor 18, in which the second spacing is greater than the first spacing. A set of fasteners, not illustrated in the Figures, can extend through positioning holes at varying positions fore and aft in the sidewall 11 of the housing 10 and engage co-operating bores, such as screw threaded bores, in the classifying ring 44 to secure the classifying ring 44 in any one of a selection of the positions described above.

The second parameter by which the classifying ring 44 can be adjusted is in the angle of inclination of the leading surface of the classifying ring that faces toward the rotor 18. The leading surface forms an angle (A) to the sidewall 11 of the housing 10, see FIG. 2. The angle (A) of inclination of the leading surface to the sidewall 11 of the housing 10 may be at an obtuse angle in the range of 125° to 135°, or angle (B) in the range of 35 to 45° acute in the body of the classifying ring 44.

The third parameter by which the classifying ring 44 can be adjusted is the height of the classifying ring 44 relative to the sidewall 11 of the housing 10. The height of the classifying ring 44 increases in a direction radially inward of sidewall 11 of the housing 10. By way of example, the classifying ring 44 may have a height in the range of 10 to 80 mm, suitably in the range of 20 to 70 mm, and ideally in the range of 30 to 50 mm.

Exploded views of the device 8 shown in FIGS. 5 and 9 illustrates two classifying rings 44 of different sizes, in which the inclined surface faces the rings having different angles and the heights of the rings are different. However, it will be appreciated that only one of the classifying rings 44 would be fixed in a desired operating position during operation of the device 8. In FIG. 2 illustrates two classifying rings 44 superimposed in cross-section for illustrative purposes only. In practice only one of the classifying rings 44 will be installed.

One or more of the adjustments of the classifying ring 44 described above may provide a means for controlling the size of the particles being discharged from the device 8.

Milled particles are discharged from the device 8 via the product outlet 26 positioned between the classifying ring 44 and the rear wall 13 of the housing 10. In one example, as best seen in FIG. 5, the product outlet 26 includes an opening in the sidewall 11 and a duct that allows particles to be discharged from the housing 10 in a direction tangential to the movement of the swirling air in the housing 10. The product outlet 26 may also include another opening in a rear wall 13 and a duct attached to the rear wall 13 of the housing 10 for discharging milled material. It is intended that only one of the openings of the product outlet 26 would be used at any one time, and in which case a plug 45 can be positioned in the outlet opening that is not in use. FIG. 5 illustrates a plug 45 for closing the second outlet opening 63 of the rear wall 13.

A characteristic of the milling device 8 is that the housing 11 provides a flow path 9 so that the material being milled has a controlled residence time in the milling device 8 which provides a suitable amount of milling prior to being discharged from the device 8. The flow path 9 includes the inlet funnel 24 and ducting 25 attached to the front wall 12 of the housing 10 which directs the feed material into the centre of rotor 18 so that the feed material contacts the blades 22. Following initial contact with the blades 22, the feed material moves radially outward where the material enters swirling air that flows about the perimeter of the housing 10. Particles of material move from the front of the rotor 18 to the rear of the rotor 18 as additional feed material is fed into the milling device 8. As centrifugal forces cause larger and more dense particles to be pushed closer to the sidewall 11 of the housing 10, these particles will undergo further autogenous milling before being displaced inwardly and over the classifying ring 44 so that they can be discharged from the device 8.

On account of the speed of rotation of the rotor 18, the air density and airspeed within the housing 10 will increase moving radially toward the sidewall 11 of the housing 10. We believe this has the effect of creating a reduced pressure region at, or close to, the rotational axis of the spindle 16. This can have the deleterious effect of drawing lubricant out of bearings 33 on which the spindle 16 is mounted if the bearings are not at least partly shielded from the flow path. Moreover, the high-speed operation of the spindle 16 and the frictional nature between particles of the feed material and the rotor 18 can quickly generate heat, making the bearings 33 susceptible to heat damage. Heat damage generally occurs when inadequate lubricant is available, for instance, if lubricant is drawn out of the bearings 33 as a result of the reduced pressure created by the high speed of rotation of the rotor 18, and/or in the event that the lubricant deteriorates or breaks down which can occur when lubricant reaches temperatures in the range of 80 or 90° C. Above 90° C., lubricants can quickly breakdown, and if not rectified, the bearings 33 may be permanently damage. It is therefore desirous to prevent the leakage of lubricant from the bearings 33 and control the temperature of the bearings 33, or a housing of the bearings, to an appropriate operating temperature.

A wall formation including the rear wall 13 and the baffle 27 about the spindle 16 defines a plenum chamber 28 that extends about, as much as possible, of the spindle 16 between the rear wall 13 of the housing 10 and the rotor 18. In part, the baffle 27 at least partly shields the end of the spindle 16 in the housing 10 and the bearings 33 that mount the spindle 16 from the reduced pressure environment created by the speed of rotation of the rotor 18. In addition, the baffle 27 also at least partly shields the spindle 16 from direct contact with particles in the flow path 9 and thereby prevents: (i) direct heat transfer from the particles to the spindle 16; and (ii) direct heat transfer from swirling air in the housing 10 with the spindle 16, both of which have the potential to overheat the bearings 33.

The baffle 27 forms part of a cooling assembly 35 that can be used for cooling the spindle 16 and therefore also the bearings 33. The baffle 27 has a cylindrical inner wall 29 that is spaced about the spindle 16, between the spindle 16 and the outer sidewall 11 of the housing 10. The spindle 16 includes a spindle housing 17 that is fixed in a cradle 21, and the spindle 16 extends along the spindle housing 17, and extends from opposite ends of the spindle housing 17, namely a first end 61 in the housing 10 to which the rotor 18 is connected, and a second end 62 outside the cradle 21 to which the drive pulleys are connected. The spindle 16 is mounted in the spindle housing 17 by way of the bearings located at the first and second ends 61 and 62 of the spindle housing. The spindle housing 17 may have any suitable dimension, and in the preferred embodiment, the spindle housing 17 has an outer diameter of approximately 125 mm and the core of the spindle 16 has an outer diameter of approximately 55 mm. The cylindrical inner wall 29 of the baffle has a diameter of approximately 250 mm and extends from the rear wall 13 of the housing 10 toward the blades 22 on the rear of the rotor 18. The baffle 27 also includes an end wall 30 that is arranged laterally to the cylindrical inner wall 29 and parallel to the face of the rotor 18 and the blades 22 on the rear of the rotor 18. Ideally, the end wall is spaced from the blades 22 at the rear of the rotor 18 at a spacing ranging from 1 to 4 mm, and suitably 3.5 mm. The end wall 30 is an annulus having an inner aperture that fits about a hub 46 of the spindle 16 to which the rotor 18 is attached. The inner aperture is sized to form an clearance gap 31 of up to 2 mm, and ideally approximately 1 mm between the inner edge of the annulus to the hub 46 of the spindle 16. The size of the annulus formed by the end wall 30, and indeed the coverage of the rotor 18 and the blades 22 by the end wall 30 will impact on the speed of the air swirling within the housing 10 which is induced by blades/vanes 22. The clearance gap 31 allows rotation of the spindle 16 and allows restricted passage of air from the plenum chamber 28 to the flow path 9, thereby at least partially shielding the bearings 33 from the reduced pressure in the flow path 9, and effectively and substantially preventing the lubricant of the bearings 33 being drawn out of the bearings 33.

The flow of air through the flow path 9 of the milling device 8 also controls the residence time of the feed material in the milling device 8 and, in turn the size of the particles being discharged. In addition, controlling flow of air through the milling device 8 will provide a means for controlling dehydrating of material through the milling device 8. The diameter of the end wall 30 can be selected to adjust the air flow rate in the flow path 9.

In the case of the preferred embodiment, the outer diameter of the end wall 30 is approximately 320 mm, however, it will be appreciated that the end wall 30 may have an outer diameter equal to or less than the cylindrical inner wall 29 of the baffle 27. In this case although not illustrated in the Figures, the cylindrical inner wall 29 of the baffle 27 may have a conical or tapered diameter. In other examples, not illustrated in the Figures, the end wall 30 may have an outer diameter in the range of 200 mm to 450 mm, suitably 250 mm to 400 mm, and even more suitably in a range of 300 to 350 mm.

The plenum chamber 28, in part define by the baffle 27, has an air inlet 32 for allowing ambient air to enter the plenum chamber 28, which can minimise, if not eliminate, a pressure differential across the bearings at the first end 61 of the spindle housing 17 and thereby reducing the likelihood of the lubricant being drawn out of the bearings. In the case of the preferred embodiment the air inlet 32 is provided as a kidney shaped opening in the rear wall 13 of the housing 10. As a result of the reduced pressure generated within central region of housing 10, a controlled air stream is drawn from the plenum chamber 28 through the clearance gap 31 between the end wall 30 and the hub 46 of the spindle 16 into the flow path 9, thereby drawing ambient air over the spindle 16 into the flow path 9. In the event the end of the spindle 16 within the plenum chamber 28 rises above ambient temperature, heat can be transferred from the spindle 16 to the air stream passing through the plenum chamber 28, and in turn cool the bearings 33.

Figure 3:
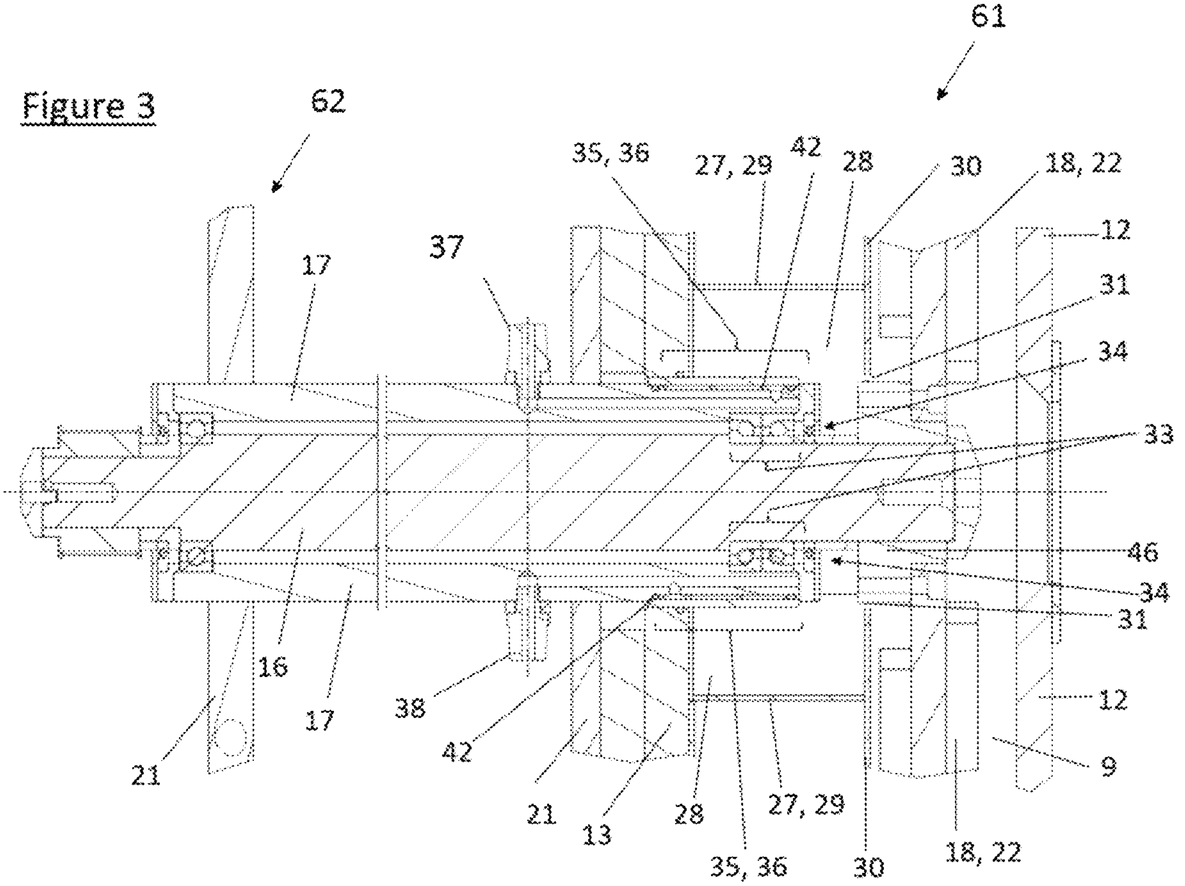
FIG. 3 is an enlarged view of a central region of housing comprising, bearings, a cooling assembly for cooling the bearings, and a plenum chamber about the spindle and in part annulus portion of a flow path through the housing.
Figure 4:
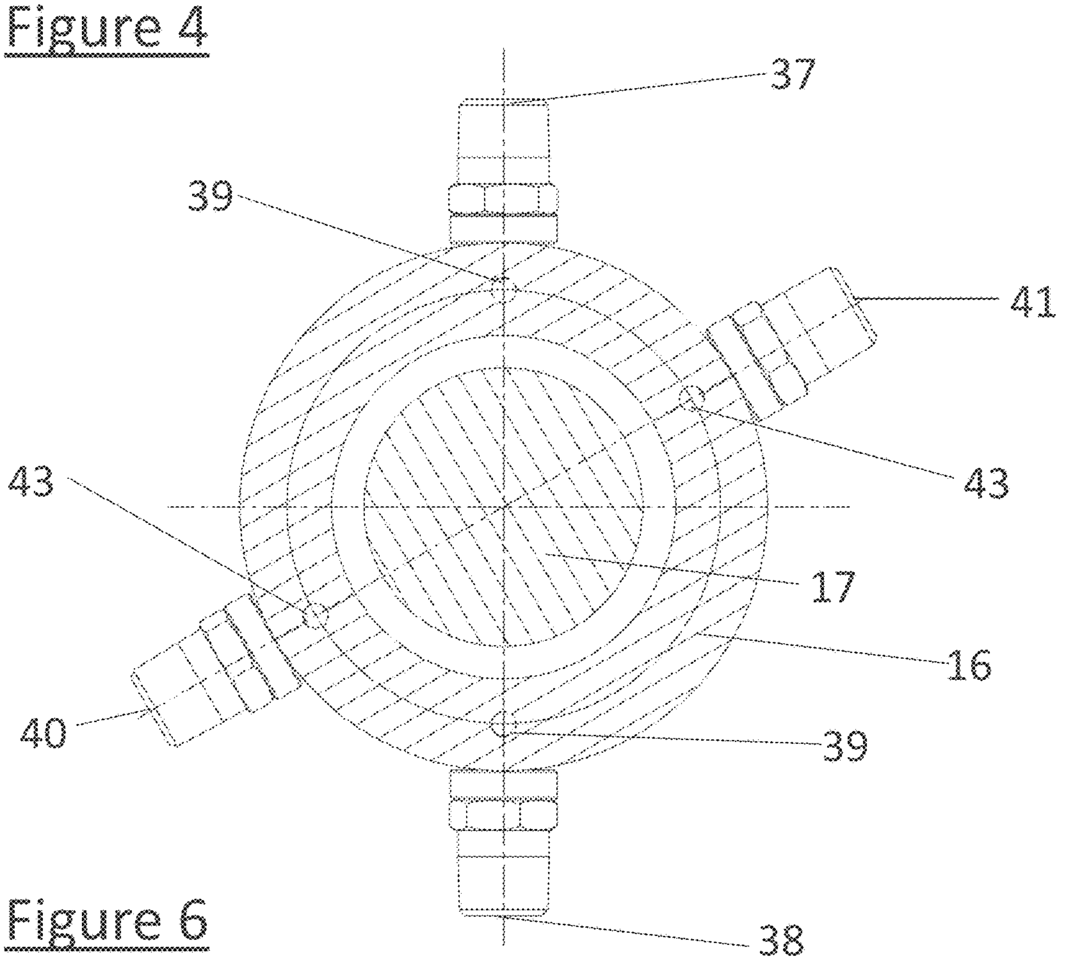
FIG. 4 is an end cross-section view through the longitudinal axis of the spindle showing an air inlet, an air outlet, a water inlet and a water outlet that form part of the cooling assembly.
Figure 6:
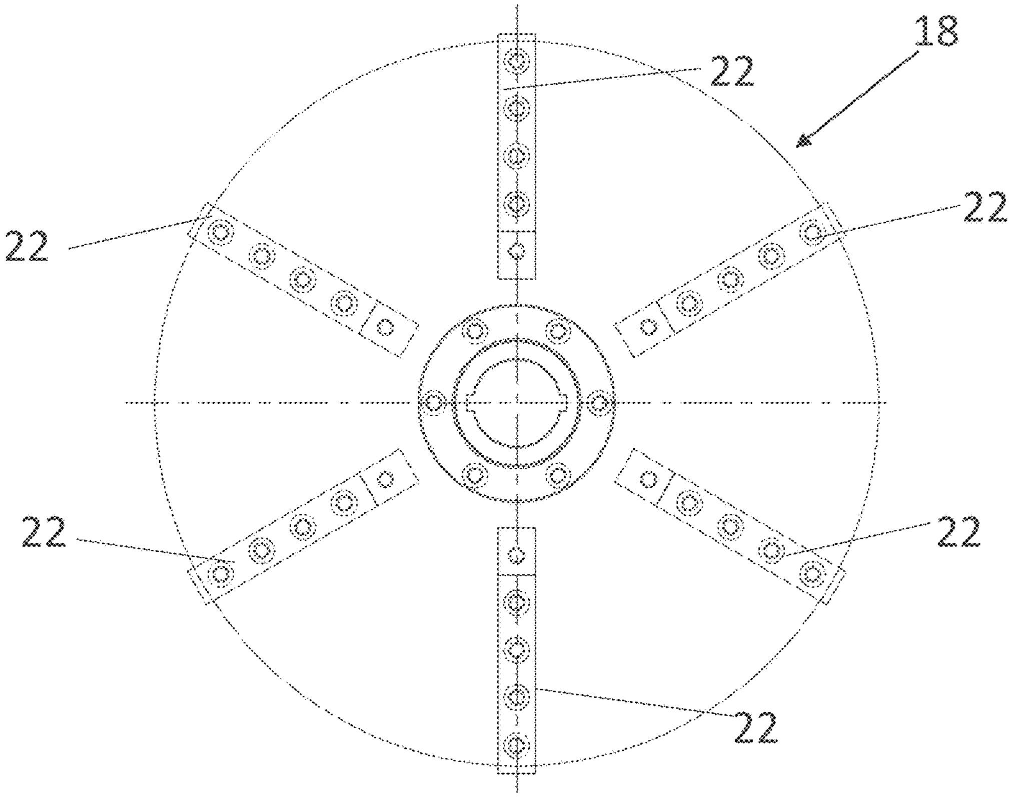
FIGS. 6 and 7 are front and perspective views respectively of the rotor shown in FIGS. 1 and 2.

As can be seen in FIGS. 2, 3 and 4, the spindle 16 is mounted to the spindle housing 17 in the plenum chamber 28 by bearings 33. The bearings 33 may be made of any suitable material including silicon carbide balls, or a carbon steel balls, or stainless steel. The bearings 33 are packed with a lubricant and a labyrinth seal 34 is located at the end of the bearing 33. If required, additional air pressure can be provided to the plenum chamber 28 via an air supply to prevent leakage of lubricant. As can be seen FIG. 4, an air supply coupling 37 is provided for supplying air and an air discharging coupling 38 for discharging air in the spindle housing 17. In one example, the air passageway 30 can have an opening into the plenum chamber 28 for pressurising the plenum chamber 28 to prevent leakage of lubricant through the labyrinth seal 34. In another example, the air passageway 30 can be used solely for increasing heat transfer from the spindle housing 17 for cooling the bearings 33. In this example, an air stream may be confined to the air passageway 30 located within the spindle housing 17 for cooling the spindle. If required, the air stream may also be allowed to enter the plenum chamber 28 and be withdrawn via the air passageway 30. In other words, the air couplings 37 and 38 may have dual purposes of pressurising the plenum chamber 28 to prevent leakage of lubricant from the labyrinth seal 34 and may also form part of the cooling assembly 35 for cooling the spindle 16, spindle housing 17 and the bearings 33. The air couplings 37 and 38 may be any suitable snap on and off couplings.

In addition, the cooling assembly 35 may include a cooling jacket 36 through which a cooling water can be circulated. Specifically, as can best be seen in FIG. 3, a coil 42 for cooling water can be arranged around the first end 61 of the spindle housing 17. As shown in FIG. 4, a water inlet coupling 40 for supplying water to the coil 42 and a water outlet coupling 41 for discharging water from the coil 42 are located outside of the rear wall 13 of the housing 10 and are connected to the coil 42 via water passageways 43. The water passageways 43 can be configured separately from the air passageways described above.

Although not shown in the Figures, the milling device 8 may include temperature sensor, such as digital thermocouple, for sensing the temperature of the spindle housing 17, which may be assumed to be representative of the temperature of the bearings 33. The milling device 8 may also include a first controller for adjusting the flow rate of cooling water through the cooling jacket 36 in response to an output from the temperature sensor. The first controller may also adjust the flow rate of air through the air passageway 39 for cooling the spindle housing 17. The milling device 8 may also include pressure sensor for sensing the pressure within the plenum chamber 28 and a second controller for controlling and/or adjusting the flow of pressurised air via the air passageway 39 to the plenum chamber 28.

Figure 7:
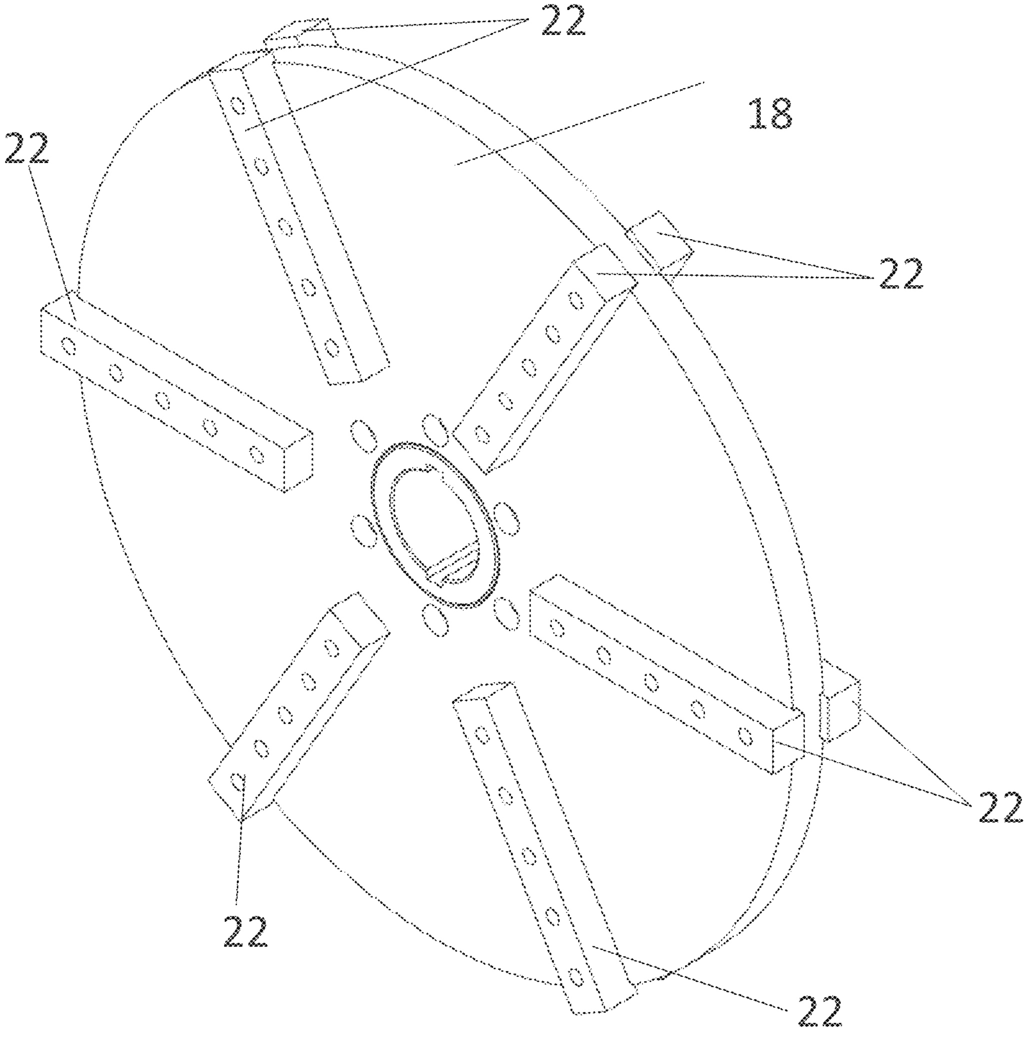
Figure 8:
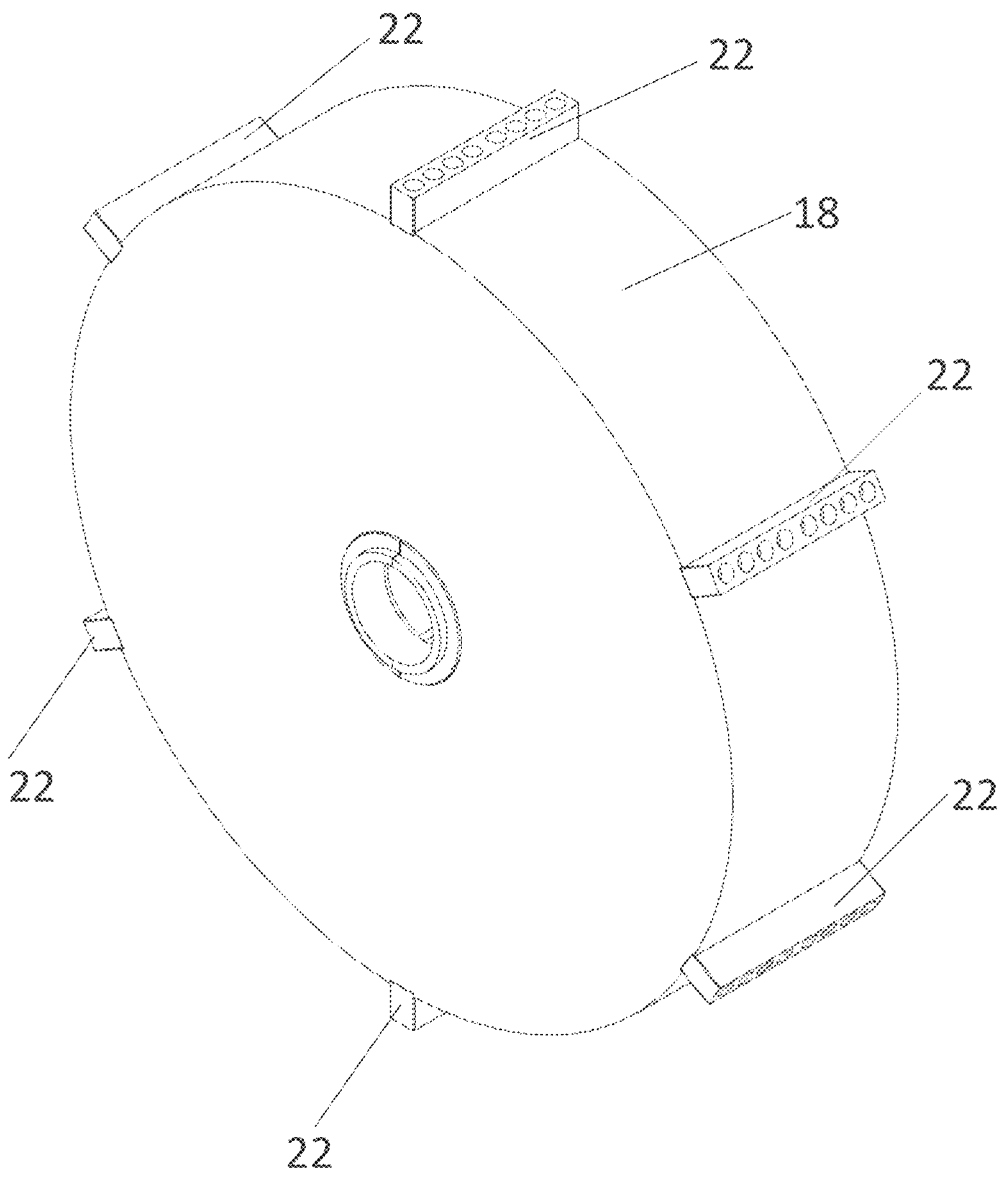
FIG. 8 is a perspective view of a rotor according to an alternative embodiment.

FIGS. 8 and 9 illustrate an alternative rotor 18 in which the main plate has a thickness greater than the main plate of the embodiment illustrated in FIGS. 7 and 8. Specifically, the main plate has an outer circumferential wall in the longitudinal direction of the cylindrical sidewall (not illustrate in FIGS. 8 and 9) of the housing and a blades or vanes 22 are positioned about the circumferential wall parallel to the axis of rotation of the rotor 18. Although FIGS. 8 and 9 illustrate no blades or vanes on the front and rear walls 12 and 13 of the rotor 18, it will be appreciated that blades or vanes may be located on these walls if desired. In addition, the inner surface of the sidewall of the housing can have friction inducing portions to enhance autogenous milling of the particles. Although it is preferred that no friction inducing surfaces be provided.

The rotor 18 shown in FIGS. 8 and 9 is particularly suited for milling the feed material to very small particles. When used in this application, a significant amount of heat can be generated quickly within the housing 10.

Although not illustrated in FIGS. 1 to 9, the housing 10 can be modified to include a second cooling assembly which may include: a first cooling jacket about the sidewall 11 of the housing 10, a second cooling jacket on the front wall 12 of the housing 10, and a third cooling jacket on the rear wall 13. In one example, the first, second and third cooling jackets may be flow connected with cooling fluid flowing from one cooling jacket to the next. In another example, the first, second and third cooling jackets may be operated independently in the sense that separate streams of the cooling fluid may be conveyed through the first, second and third cooling jackets.

FIG. 10 illustrates method steps for operating the milling device 8 shown in FIGS. 1 to 9. The method includes step 100 of supplying feed material to the milling device 8, and operating a rotor 18 of the milling device 8 at speeds to allow impact milling and autogenous milling. For example, the outer periphery of the rotor 18 may reach speeds in the order of 700 to 1,200 km/hr. The method step 100 also includes discharging milled material from an annulus portion 19 of the milling device. Method step 110 includes locating a wall formation within the housing 10 of the milling device 8 in which the wall formation is located about the spindle 16 so that the spindle 16 is located outside of the flow path, and in particular the annulus portion 19 of the flow path 9. In this arrangement the spindle 16, and in particular the mounting assembly of the spindle 16, including bearings 33, are located outside of the flow path 9 and, therefore, not exposed to reduce pressure conditions generated by way of the operating speed of the rotor 18. Method step 120 includes providing the wall formation with an end wall 30 that is spaced by clearance gap 31 from an end of the spindle 16 on which the rotor 18 is mounted that extends into the housing 10. The end of the spindle 16 comprises hub 46.

Method step 130 includes selecting the area over which the end wall 30 covers the rear surface of the rotor 18. For example, step 130 may include selecting a baffle 27 from a set of baffles having different end wall 30 sizes. In another example, step 130 may include forming a baffle 27 having a selected end wall size. The size of the end wall 30 can, at least in part, influence the flow rate of air in the flow path 9 of the milling device 8 which in turn, affects the residence time of the milled material in the milling device 8, the particle size of the milled product, and in some instances the dryness of the milled product.

Method step 140 includes sensing the temperature of the spindle 16, for example, by means of a thermal couple attached to the spindle housing 17 and operating a first cooling assembly 35 to control the temperature of the spindle 16. For example, operating the first cooling assembly 35 may include passing air through the plenum chamber 28 to transfer heat from the spindle housing 17 to the air. In another example, operating the first cooling assembly 35 may include passing cooling water through coil 42 arranged about the spindle housing 17 adjacent to bearings 33 on which the spindle 16 is mounted. The main purpose of method step 140 is to avoid the lubricant of the bearings 33 from overheating. Method step 150 includes sensing the temperature of the housing 10 and operating a second cooling system to control the temperature of the housing 10. Although not illustrated in the figures, the second cooling system may include a water jacket. The main purpose for cooling the housing 10 is to control the temperature of the rotor 18, the housing 10 and air and milled material passing through the housing 10.

Method step 160 includes selecting a classifying ring 44 from two or more classifying rings 44. Each classifying ring 44 has an inclined surface that faces the rotor 18 and provides a barrier over which milled material must flow. In other words, the classifying ring 44 to some extent controls the residence time of the material located in a high velocity portion of the milling device 8 and therefore can control the extent of autogenous milling of the feed material. The classifying rings 44 may differ in one or more of the following geometric dimensions: i) height of the rings 44, or ii) angle of inclination of the leading face of the rings 44.

Method step 170 includes operating a quick release mechanism to open the front wall 12 of the housing 110 for cleaning of the milling device 8 between scheduled milling tasks, which may be prescribed when the milling device 8 is used for food material. The quick release mechanism may also allow rapid access to the inside of the housing 10 for scheduled or unscheduled maintenance. As described in relation to FIG. 9, the quick release mechanism may include the sliding locking ring 54 having locking notches 55 that press against engagement notches 58 of the front wall 12.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms. The terms "vertical" and "horizontal" when used in reference to the humidification apparatus throughout the specification, including the claims, refer to orientations relative to the normal operating orientation.

Furthermore, invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, for example, aspects of one embodiment may be combined with aspects of another embodiment to realize yet other embodiments. Further, each independent feature or component of any given assembly may constitute an additional embodiment.

For example, the milling device may have multiple internal rotor(s) rotating within the housing.

In yet another example, the classifying ring may be omitted from the housing and the outlet opening up located in the rear wall may be located at a radial spacing from the sidewall of the housing. The magnitude of the spacing between the sidewall of the housing and the lower edge of the outlet opening in the rear wall may act as a means for controlling the residence time of the material in the housing during milling.

REFERENCE NUMERAL TABLE

| | |
|---|---|
| milling device | 8 |
| flow path | 9 |
| housing (mill housing) | 10 |
| cylindrical sidewall (of the housing) | 11 |
| front wall | 12 |
| rear wall | 13 |
| base chassis | 14 |
| motor | 15 |
| spindle | 16 |
| spindle housing | 17 |
| rotor | 18 |
| annulus portion | 19 |
| baseplate | 20 |
| cradle | 21 |
| blades/vanes | 22 |
| feed inlet | 23 |
| funnel | 24 |
| ducting | 25 |
| product outlet | 26 |
| baffle | 27 |
| plenum chamber | 28 |
| inner cylindrical wall | 29 |
| end wall | 30 |
| clearance gap | 31 |
| air inlet | 32 |
| bearings | 33 |
| labyrinth seal | 34 |
| first cooling assembly | 35 |
| cooling jacket | 36 |
| air supply coupling | 37 |
| air discharge coupling | 38 |
| air passageway | 39 |
| water inlet coupling | 40 |
| water outlet coupling | 41 |
| coil | 42 |
| water passageway | 43 |
| classifying ring | 44 |
| plug | 45 |

-continued

| REFERENCE NUMERAL TABLE | |
|---|---|
| hub | 46 |
| feet | 47 |
| hinge mechanism | 48 |
| first pivot pin | 49 |
| hinge linkage | 50 |
| second pivot pin | 51 |
| front wall bracket | 52 |
| clamping bolts | 53 |
| sliding locking ring | 54 |
| locking notches | 55 |
| actuator | 56 |
| pneumatic piston and cylinder arrangement | 57 |
| engagement notch | 58 |
| sealing gasket | 59 |

The invention claimed is:

1. A milling device that includes:
- a housing having a flow path for conveying feed material through the housing;
- a spindle extending into the housing and mounted on bearings that are at least partly shielded from the flow path;
- a rotor disposed on the spindle in the housing, the rotor having two or more blades for impacting the feed material and for driving the feed material about the housing to cause autogenous milling thereof;
- a wall formation arranged at a spacing about the spindle in the housing and delimiting a plenum chamber about the spindle so that the bearings and the spindle are at least partly shielded from the flow path by the wall formation and the plenum chamber;
- the housing having a feed inlet for supplying the feed material upstream of the rotor, and a product outlet downstream of the rotor;
- wherein the wall formation includes a rear wall and a baffle extending from the rear wall toward the spindle and toward the rear surface of the rotor, and the plenum chamber is located at least in part between the baffle and the spindle; and
- wherein operation of the rotor creates a pressure gradient in the housing with a reduced pressure zone in a central region of the housing, and a clearance gap between the baffle and the spindle and/or the rotor allows restricted passage of air to be drawn through the clearance gap which in turn draws air into the plenum chamber through an air inlet to generate air flow through the plenum chamber.

2. The milling device according to claim 1, wherein the bearings are arranged outside of the flow path and within the housing.

3. The milling device according to claim 1, wherein the wall formation defines at least part of an annulus portion of the flow path, the annulus portion having a depth in an axial direction of the spindle, and the wall formation converges toward the spindle and the rear surface of the rotor so that the spindle is shielded from the flow path.

4. The milling device according to claim 3, wherein the wall formation defines the plenum chamber about the spindle and at least part of a spindle mounting assembly on which the spindle is mounted so that the spindle mounting assembly is at least partly shielded or located outside of the flow path of the device.

5. The milling device according to claim 4, wherein the baffle includes an end wall that faces the rear surface of the rotor, and wherein the end wall is spaced from the rear surface of the rotor by a clearance gap which limits an area of the rear surface of the rotor that faces the flow path, and wherein the end wall extends outwardly from an inner wall of the baffle and covers from 10 to 60 percent of a surface of the blades on the rear surface of the rotor.

6. The milling device according to claim 1, wherein the housing includes a removable front wall for accessing the flow path and a release mechanism for securing the front wall in a closed position, wherein the release mechanism includes a locking ring that pivots, the locking ring having locking notches that engage engagement notches on the front wall when in the closed position, and wherein the locking ring can be pivoted clockwise and anticlockwise, wherein the locking notches align with gaps between the engagement notches to allow the front wall to be opened, and the locking ring is pivoted to align the locking notches with the engagement notches and press against the engagement notches when in the closed position.

7. The milling device according to claim 1, wherein the product outlet includes a first outlet opening that allows milled product to be discharged tangentially from the housing, and wherein the product outlet includes a second outlet that allows milled product to be discharged laterally from the flow path.

8. The milling device according to claim 1, wherein the rotor can be operated so that an outer periphery of the rotor has a speed up to 1200 km/hr, and wherein the spindle is driven by a motor, wherein the motor and the spindle have pulleys that are operably connected by a looped continuous belt.

9. The milling device according to claim 1, wherein the milling device has a classifying ring that extends inward toward the spindle from the housing, and wherein the classifying ring has an operating position on the housing relative to the rotor, wherein the operating position is adjustable, and wherein the classifying ring has an inclined surface extending from a sidewall of the housing at an acute angle and away from the rear surface of the rotor at an angle in a range of 120° to 170°.

10. The milling device according to claim 1, wherein the milling device has a first cooling assembly for cooling the spindle extending into the housing, and in turn for cooling a lubricant of the bearings of the spindle, and wherein the first cooling assembly includes a first cooling jacket about the spindle, and the milling device includes a first temperature sensor that detects a temperature of the spindle, and a first adjustor for adjusting a flow of a cooling medium through the first cooling assembly based on an output of the first temperature sensor.

11. The milling device according to claim 1, wherein the milling device is operable in an impact milling mode and in an autogenous milling mode simultaneously.

12. The milling device according to claim 1, wherein the wall formation defines a clearance gap between the wall formation and the spindle which allows restricted passage of air between the plenum chamber and the flow path.

13. The milling device according to claim 1, wherein the plenum chamber has an air inlet allowing air from outside the housing to enter the plenum chamber.

14. The milling device according to claim 13, wherein during operation air entering the plenum chamber via the air inlet has restricted passage into the flow path via a clearance gap.

15. The milling device according to claim 2, wherein when in use the bearings are exposed to air pressure that differs to air pressure at a central region of the housing.

16. The milling device according to claim 1, wherein the blades are positioned on front and rear surfaces of the rotor.

17. A milling device that includes:

a housing having a flow path for conveying feed material through the housing;

a spindle extending into the housing and mounted on bearings that are at least partly shielded from the flow path;

a rotor disposed on the spindle in the housing, the rotor having two or more blades for impacting the feed material and for driving the feed material about the housing to cause autogenous milling thereof;

a wall formation arranged at a spacing about the spindle in the housing and delimiting a plenum chamber about the spindle so that the bearings and the spindle are at least partly shielded from the flow path by the wall formation and the plenum chamber;

the housing having a feed inlet for supplying the feed material upstream of the rotor, and a product outlet downstream of the rotor;

wherein the milling device has a classifying ring that extends inward toward the spindle from the housing, and wherein the classifying ring has an operating position on the housing relative to the rotor, wherein the operating position is adjustable, and wherein the classifying ring has an inclined surface extending from a sidewall of the housing at an angle and away from a rear surface of the rotor.

18. A milling device that includes:

a housing having a flow path for conveying feed material through the housing;

a spindle extending into the housing and mounted on bearings that are at least partly shielded from the flow path;

a rotor disposed on the spindle in the housing, the rotor having two or more blades for impacting the feed material and for driving the feed material about the housing to cause autogenous milling thereof;

a wall formation arranged at a spacing about the spindle in the housing and delimiting a plenum chamber about the spindle so that the bearings and the spindle are at least partly shielded from the flow path by the wall formation and the plenum chamber;

the housing having a feed inlet for supplying the feed material upstream of the rotor, and a product outlet downstream of the rotor;

wherein the milling device has a first cooling assembly for cooling the spindle extending into the housing, and in turn for cooling a lubricant of the bearings of the spindle, and the milling device includes a first temperature sensor that detects a temperature of the spindle, and a first adjustor for adjusting a flow of a cooling medium through the first cooling assembly based on an output of the first temperature sensor.

* * * * *